No. 827,196. PATENTED JULY 31, 1906.
C. N. WALKER.
SELF SPREADING HOG GAMBREL.
APPLICATION FILED MAR. 29, 1905.
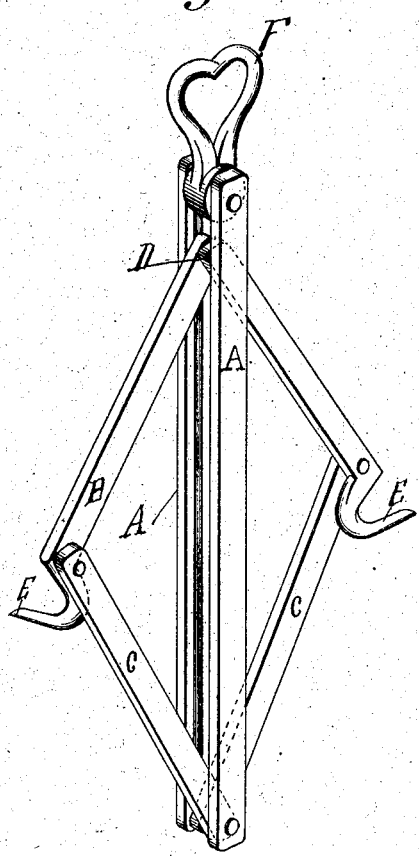
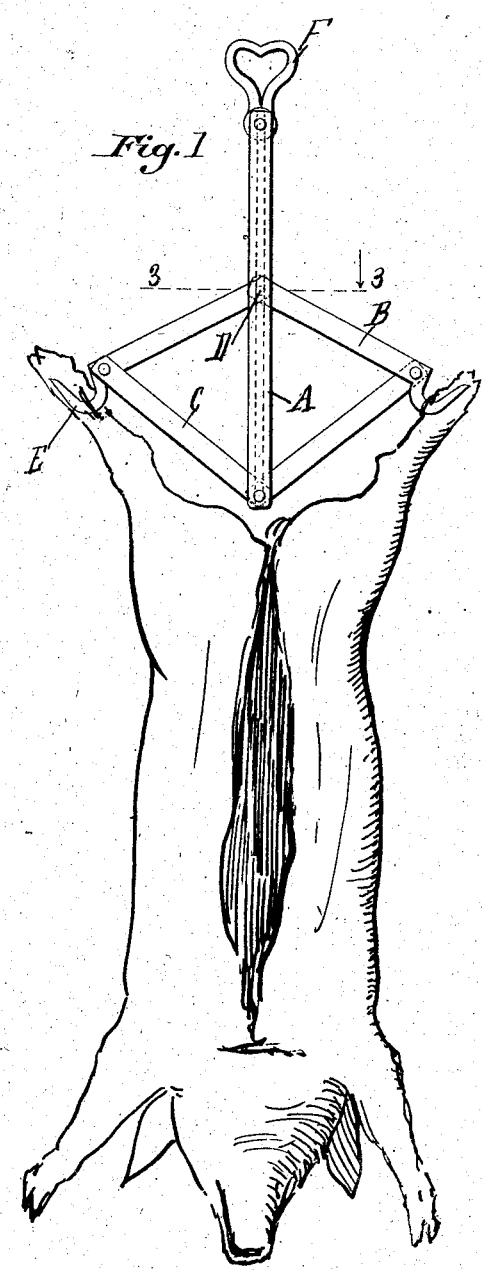
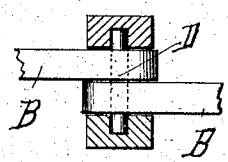
Witnesses:
E. K. Hawkins
F. M. Youngblood
Inventor:
Curtis N. Walker

UNITED STATES PATENT OFFICE.

CURTIS NORMAN WALKER, OF ALBIA, IOWA.

SELF-SPREADING HOG-GAMBREL.

No. 827,196.

Specification of Letters Patent.

Patented July 31, 1906.

Application filed March 29, 1905. Serial No. 252,790.

*To all whom it may concern:*

Be it known that I, CURTIS NORMAN WALKER, a citizen of the United States, residing at Albia, in the county of Monroe and State of Iowa, have invented a new and useful Self-Spreading Hog-Gambrel, of which the following is a specification.

This invention is a gambrel, and has for its object to provide a device of this kind having hooks which may be brought close together to facilitate their attachment to the feet or tendons of the hog or other animal and which will automatically spread the hind legs of the animal for convenience in butchering or dressing the same.

A further object is to provide a gambrel which will support one part of the animal after it has been cut in two and one of the parts has been removed, the fall of the remaining part being but a short distance, so that the animal can be hung sufficiently low or close to the floor in the first instance in order to be within easy reach of the operator.

In the accompanying drawings, Figure 1 is an elevation of the gambrel in use. Fig. 2 is a perspective view showing the position of the parts when the gambrel is empty, and Fig. 3 is a sectional detail on the line 3 3 of Fig. 1.

Referring specifically to the drawings, A denotes a supporting-frame which comprises a pair of grooved spaced bars provided at one end with a suspension-ring F, which is made heart-shaped, as shown. By reason of this shape a double suspension is provided, thus permitting the gambrel and its load to be transferred from the hoisting-hook to the track-hook without interference of said hooks.

At C is indicated a pair of spreading-bars which extend at one end between the bars A and are pivotally connected thereto. At B is indicated a pair of bars having hooks E at one end. The hook ends of the bars B are pivotally connected to the outer ends of the spreading-bars C, and the opposite ends of the bars B are connected by a pin D, which is slidably mounted in the grooves in the bars A.

In the operation of the gambrel the bars B and C are brought close together, as shown in Fig. 2, in which position the hooks E can be readily attached to the feet of the animal. The weight of the animal spreads the hooks, whereby the legs are distended for convenience in butchering or dressing. The fall of the bars B and C is but a short distance, so that the animal can be hung close to the floor within easy reach of the operator.

I claim—

A gambrel comprising a pair of connected grooved bars, a pair of spreading-bars each pivoted at one end to one end of the grooved bars, a pair of hook-bars, each having a hook a one end, a pivot guided in the grooves and connecting the other ends of the hook-bars, pivots connecting the hook end of each hook-bar to one end of each spreading-bar, and means to suspend the gambrel.

In testimony whereof I have subscribed my name to this specification in the presence of two subscribing witnesses.

CURTIS NORMAN WALKER.

Witnesses:
J. R. PRICE,
I. H. TOMLINSON.